United States Patent [19]

Knox

[11] Patent Number: 4,695,070
[45] Date of Patent: Sep. 22, 1987

[54] SAFETY HANGER FOR MUD FLAPS

[76] Inventor: Ronald A. Knox, 13262 Edinburgh Dr., Westminster, Calif. 92683

[21] Appl. No.: 869,235

[22] Filed: Jun. 2, 1986

[51] Int. Cl.$^4$ ............................................. B62D 25/18
[52] U.S. Cl. ............................................. 280/154.5 R
[58] Field of Search ................. 280/154.5 R, 154.5 A, 280/152, 153; 248/610, 611, 613

[56] References Cited

U.S. PATENT DOCUMENTS

| | | | |
|---|---|---|---|
| 3,088,751 | 5/1963 | Barry et al. | 280/154.5 R |
| 3,158,386 | 11/1964 | Tillinghast et al. | 280/154.5 R |
| 3,333,868 | 8/1967 | Sogoian | 280/154.5 R |
| 3,711,119 | 1/1973 | Hollingsworth | 280/154.5 R |
| 3,778,086 | 12/1973 | Moore et al. | 280/154.5 R |

FOREIGN PATENT DOCUMENTS 712556 10/1931 France ............................ 280/154.5 A Primary Examiner—David M. Mitchell
Attorney, Agent, or Firm—Edward E. Roberts

[57] ABSTRACT

The hanger, for mounting a mud flap to a vehicle mounted with an horizontal depending flange on each side, has at least two hanging, flexible and substantially non-stretchable bars pin-connected at one end in space apart relationship to the flange. To each of the respective pins is pin-connected a flexible but stretchable bar. The lower end of each non-stretchable bar has a vertically disposed elongated slot through which extends a support pin for the mud flap. Each support pin snugly passes through a hole formed along the upper edge of the mud flap and also snugly passes through a suitable hole formed on the lower end of the stretchable bar. The length of each stretchable bar in such that, under normal conditions with only the weight of the mud flap being supported by the support pin and, in turn, by the stretchable bars, the support pin is disposed adajcent the upper end of the elongated slot. Then whenever a downward pull is exerted on the mud flap the stretchable bars become elongated and each support pin rides downward within the respective elongated slot.

5 Claims, 4 Drawing Figures

U.S. Patent  Sep. 22, 1987  4,695,070
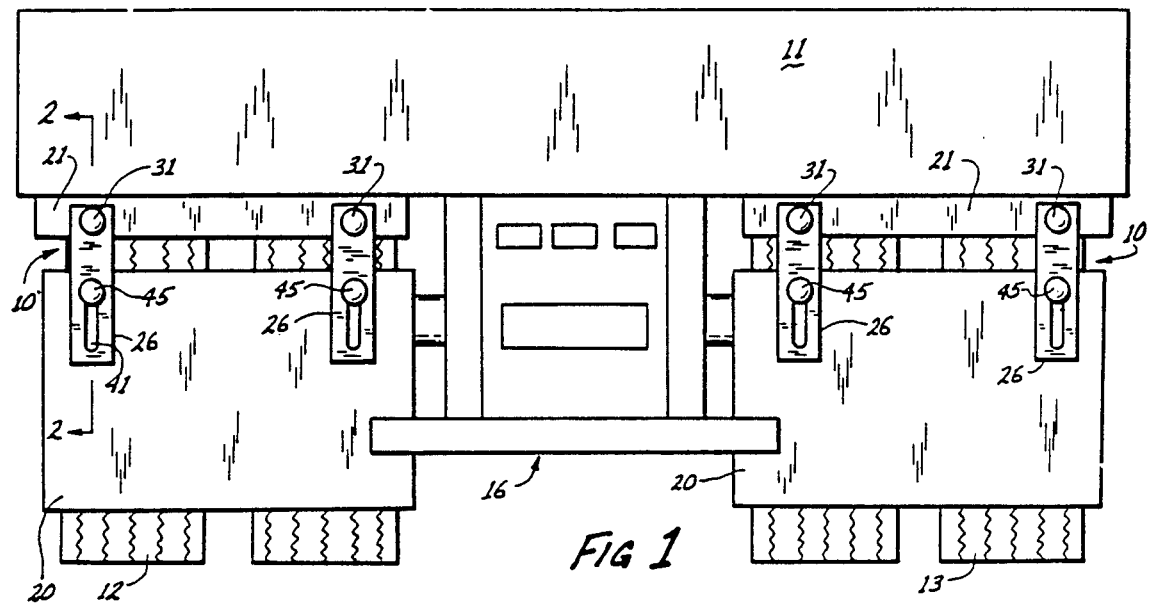
FIG 1
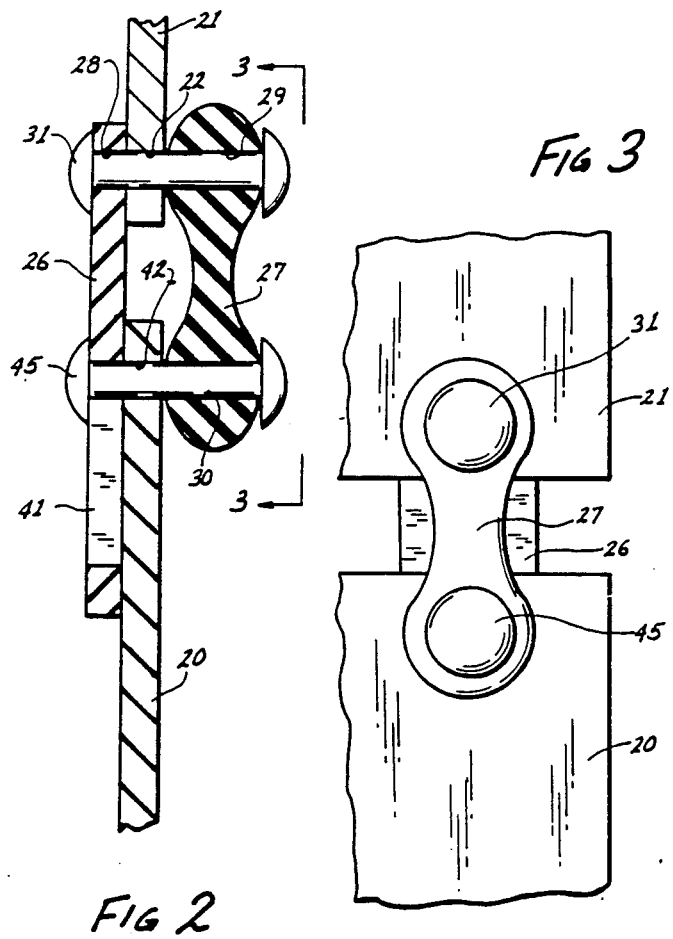
FIG 2
FIG 3
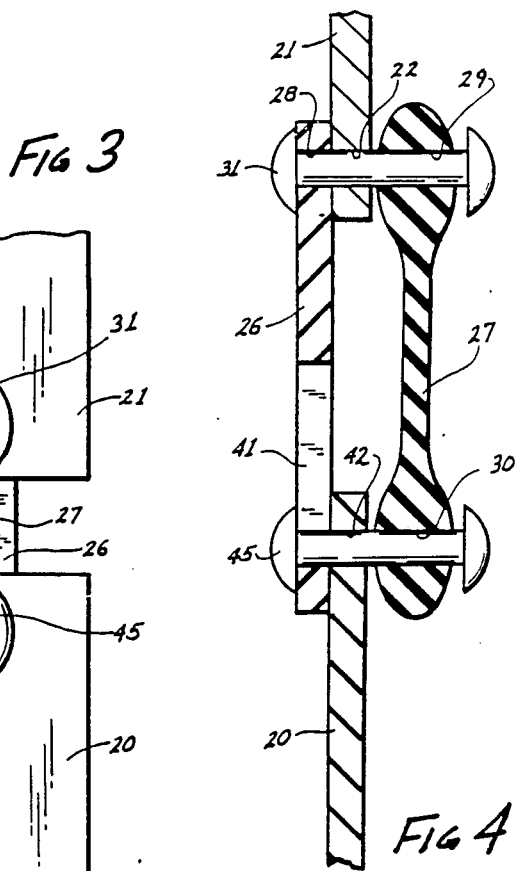
FIG 4

SAFETY HANGER FOR MUD FLAPS

FIELD OF THE INVENTION

The present invention relates to an hanger for supporting depending mud flaps to a vehicle, and more particularly, to an hanger which allows the mud flap to pull away from the vehicle without destroying the hanger or losing the mud flap.

BACKGROUND OF THE INVENTION

In the past there have been many proposals for the provision of spring loaded hangers for mounting mud flaps on, for example, a truck. Such prior art structures have been disclosed in U.S. Pat. Nos. 4,352,502; 4,189,165; 3,999.774; 3,737,176; 3,401,953; and 3,224,791. While the prior art structures have been generally somewhat useful for the intended purposes they were conceived, they are somewhat expensive to install and to replace if broken. If the prior art structure are not expensive they tend to allow the mud flaps to shake up and down at high speed freeway travel whereby the useful effect of the mud flap is greatly reduced, i.e., they lose their effectiveness in preventing the rearward projections of stones, (for example, which have been caught in the wheel) onto the traffic behind.

OBJECTS OF THE INVENTION

An object of this invention is to provide an economical effective safety hanger for a mud flap.

Another object of the invention is to provide a safety hanger that allows the mud flap to be extended and retracted from the trailer.

Another object of the invention is to provide a safety hanger for a mud flap while still maintaining stability to the mud flap as the trailer moves at high speeds along the freeway.

These and other objects of the invention will become more apparent after one studies the following description of the preferred embodiment of the invention together with the appended drawings.

BRIEF DESCRIPTION OF THE DRAWING

FIG. 1 is a schematic rear view elevation of a truck or trailer which shows the combination of my new resilient safety hanger for the mud flap.

FIG. 2 is a partial cross-sectional side elevation taken on line 2—2 of FIG. 1 in the direction of the arrows showing more clearly the details of the preferred embodiment of my resilient safety hanger for the mud flap with the mud flap shown in the normal position.

FIG. 3 is an elevation and partial view taken on line 3—3 of FIG. 2 and in the direction of the arrows.

FIG. 4 is another partial cross-sectional side elevation substantially similar to FIG. 2 showing the mud flap extended or pulled down and away from the trailer.

DETAILED DESCRIPTION OF THE DRAWING

My new resilient safety hanger is shown in FIG. 1 which shows the rear elevation of a dual wheel truck from the rear. The truck is schematically shown as having a bumper 11 and spaced apart, dual wheels 12 and 13 connected together by a housing 14. Extending downward from the bumper 11 and centrally located is a bracket 16 for supporting the license plates. The truck is a standard truck as one would find on the highways, but as everyone knows the details of the truck may not be exactly as shown in FIG. 1. My novel safety hanger is generally note as item 10 and there are shown two hangers 10 mounted on the truck, each of which support a mud flap 20.

My novel hanger 10 will now be described. Rigidly fixed to the underside of the truck are two spaced apart depending verticle flanges 21 which are suitably mounted to the truck. Referring to FIG. 2, the upper portion of one of the mud flaps 21 and of one of the two hangers 10 is shown in side elevation. The flange 21 has two horizontally disposed holes 22 of which one is shown in FIG. 2. The mud flap 20 is hung from one of the flanges 21 with the aid of a resilient and somewhat non-stretchable bar 26 and a stretchable bar 27. The bar 26 has a round hole 28 at the upper end and the bar 27 has a round hole 29 also at its upper end. A pin 31 extends through the hole 28 in the non-stretchable bar 26, the hole 22 in the flange 21 and the hole 29 in the stretchable bar 27.

The lower end of bar 26 has an elongated slot 41 more clearly shown in FIG. 1. The stretchable bar 27 has another round hole 30 (FIG. 2) at its lower end, while the mud flap 21 has two spaced apart holes 42 adjacent its upper edge. Only one of the holes 42 can be shown in detail in FIG. 2. Another pin 45 is used to extend through the slot 41 in the non-stretchable bar 26, the hole 42 in the mud flap 20 and the hole 30 in the stretchable bar 27.

The hanger 10 is able to stretch whenever a downward pull is placed on the mud flap 20. As the prior art states, this downward pull happens whenever the rear wheels 12 and 13 are backed up against a parking block (not shown) and the respective flap 20 gets caught between the wheel and the curb. Therefore, any downward pull on flap 20 causes the stretchable bar 27 to stretch because pins 45 are urged downwards transferring tension to the bars 27 as shown in FIG. 3. Pin 45 rides down the respective slot 41. The length of slot 41 is made of a convenient length which anyone skilled in the art can determine. Of course, one would not make the slot 41 of a length whereby before the pin 45 reaches the lower edge as shown in FIG. 3, the stretchable bar 27 would have broken because it has passed its elastic limit. The stretchable bar 27 can be made of many materials and I have found a stretchable grade of neoprene to be adequate. The materials I found useful to make the flexible and non-stretchable bars 26 is the same material out of which the mud flaps 20 are made.

Having described the preferred embodiment of my invention one skilled in the art, after studying the above disclosure could devise other embodiments without departing from the spirit of my invention. Therefore, my invention is not limited to the disclosed embodiment, but includes all embodiments falling within the scope of the appended claims.

I claim:

1. In combination with a road vehicle which travels on wheels;
   a. at least two non-stretchable bars, each having a first end for securing to and depending from said vehicle in generally parallel relation at a position rearwardly of at least one of said wheels relative to the normal direction of travel of said vehicle;
   b. each of said non-stretchable bars having an elongated slot formed therein;
   c. at least two stretchable bars, each having first and second ends, with means on said first ends for securing to said vehicle in proximate relation to said first ends of said non-stretchable bars, each of said stretchable bars having a hole formed in the second end thereof;
d. a mud flap having at least two holes disposed adjacent an upper edge thereof;
e. a pin disposed and through said slot, one of said holes on said mud flap and said hole on said stretchable bar so that said pin is capable of sliding along said slot, said mud flap being supported by said stretchable bars in the normal position with each of said pins adjacent the upper end of its respective slot, said mud flap further being guided by said pins within said slots upon downward force being applied to said mud flap, and guided for return to its normal position under the return bias of said stretchable bars when said force is removed.

2. The combination of claim 1 wherein:
a. a depending flange is provided on said road vehicle;
b. each of said non-stretchable bars is fastened by said first end to said flange in spaced-apart relationship; and
c. each of said stretchable bars is also fastened by said first end thereof to said flange.

3. The combination of claim 2 wherein each of said non-stretchable bars is disposed rearwardly of a respective one of said stretchable bars.

4. The combination of claim 3 wherein the length of each of said slots is such that when said pin therethrough is adjacent the lower end of the slots the respective stretchable bar maintains its resiliency.

5. In combination with a road vehicle which travels on wheels;
a. at least two generally identical non-stretchable bars, each having a first end for securing to and depending from said vehicle with said non-stretchable bars in generally parallel relation at a position rearwardly of at least one of said wheels relative to the normal direction of travel of said vehicle;
b. each of said non-stretchable bars having an elongated slot formed therein;
c. at least two stretchable bars, each having first and second ends, with means on said first ends for securing to said vehicle in proximate relation to said first ends of said non-stretchable bars;
d. a mud flap having an upper edge portion;
e. fastening means associated with each of said non-stretchable bars, each of said fastening means having a pin portion disposed and through said slot, said fastening means being attached to said upper edge portion and to said second end of said stretchable bar with said mud flap between said stretchable bar and said non-stretchable bar, so that said pin portion is capable of sliding along said slot, said mud flap being supported by said stretchable bars in a normal position with each of said pin portions adjacent the upper end of its respective slot, said mud flap further being guided by said pin portions within said slots upon downward force being applied to said mud flap, and guided for return to its normal position under the return bias of said stretchable bars when said force is removed.

* * * * *